United States Patent [19]

Aoki et al.

[11] 4,320,946

[45] Mar. 23, 1982

[54] CAMERA FOCUS DETECTING DEVICE

[75] Inventors: Harumi Aoki, Kiyose; Katsuhiko Miyata, Ageo; Yoshio Sawada, Tokyo, all of Japan

[73] Assignee: Asahi Kogaku Kogyo Kabushiki Kaisha, Tokyo, Japan

[21] Appl. No.: 117,932

[22] Filed: Feb. 4, 1980

[30] Foreign Application Priority Data

Feb. 13, 1979 [JP] Japan .................................. 54-15254

[51] Int. Cl.³ .......................................... G03B 3/00
[52] U.S. Cl. ..................................... 354/25; 250/201
[58] Field of Search .................... 354/25, 31; 352/140; 250/201, 204, 209

[56] References Cited

U.S. PATENT DOCUMENTS 4,005,443  1/1977  Albrecht ............................... 354/25
4,133,606  1/1979  Hosoe et al. ........................... 354/25

FOREIGN PATENT DOCUMENTS 51-140150 12/1976 Japan .

*Primary Examiner*—L. T. Hix
*Assistant Examiner*—W. J. Brady
*Attorney, Agent, or Firm*—Sughrue, Mion, Zinn, Macpeak and Seas

[57] ABSTRACT

An automatic focus detecting device for a camera in which a contrast signal is produced which is made independent of variations and brightness of the object being viewed and of vibrations of the camera by utilizing an out-of-focus image on an average illumination detecting photoelectric element. The average illumination detecting photoelectric element is disposed in a plane perpendicular to the optical axis of an optical image of the camera. A pulse generator produces an output clock pulse signal having a frequency which is controlled by the output signal from the average illumination detecting photoelectric element. A self-scanning type photoelectric element array is scanned with this variable frequency clock pulse train wherein the frequency of the clock pulses is increased when the brightness of the object being viewed increases to thereby increase the dynamic range of the device.

6 Claims, 9 Drawing Figures

CAMERA FOCUS DETECTING DEVICE

BACKGROUND OF THE INVENTION

The present invention relates to a device for automatically detecting focus in a camera by detecting the contrast of the image of an object to be photographed with a self-scanning type photoelectric element. More particularly, the invention pertains to an improvement of such a device which makes it possible to detect focus even when the brightness of the object viewed changes.

It is a well-known principle that, for an optical image of an object to be photographed and formed through a lens, the difference in brightness of the image, that is, the contrast of light and shade of the image reaches its maximum value at the point of focus. This is due to the fact that the optical intensity (power spectrum) of the image with respect to each spatial frequency becomes a maximum at the point of focus. A variety of devices for detecting focus utilizing this phenomenon have been proposed in the art.

In one such device the power spectrum distribution of the image of an object is electrically scanned with a selfscanning type photoelectric element producing a time-series signal electrically processed to dynamically detect the contrast. The self-scanning type photoelectric element includes a plurality of microphotoelectric elements and a scanning circuit. It is called an MOS-FET type or a CCD type depending on the arrangement of the scanning circuit employed, both of which are commercially available. The photoelectric element is capable of accumulating charges in correspondence with the quantity of light applied during a single scanning period. Accordingly, if the scanning rate of the photoelectric element is maintained unchanged, then the amount of charge accumulated thereby changes with the intensity of the incident light. As the scanning rate is made slower, the amount of charge accumulated is increased. Therefore, even if the intensity of light is low, the photoelectric element can provide a sufficient output.

In one example of an automatic focus detecting device utilizing a self-scanning type photoelectric element, a single edge portion having the highest contrast of the portions of the image of an object applied to an array of microphotoeletric elements is selected and the difference between the outputs of two microphotoelectric elements adjacent to or on both sides of the microphotoelectric element to which the edge portion is applied is sensed and focus is determined from the increases and decreases in the output difference. In the device, even if the contrast of an object to the photographed is constant, the difference between the outputs of the two microphotoelectric elements will vary as the brightness of the object is varied. If the intensities of lights applied to the two microphotoelectric elements are represented by $E_1$ and $E_2$, respectively, then the output difference $\Delta V$ is:

$$V = \frac{(E_1 - E_2) T_o S_p}{C_j},$$

where $T_o$ is a single scanning time period, $S_p$ is the optical sensitivity of the photoelectric element, and $C_j$ is the junction capacitance.

If the brightness of an object to be photographed increases or decreases by a factor $\alpha$, then the output difference $\Delta V'$ varies correspondingly ($\Delta V' = \alpha \Delta V$). Therefore, if the brightness of the object is changed, then it is impossible to properly detect the focus point. On the other hand, in a self-scanning type photoelectric element, the dynamic range of the element's output signal with respect to luminous flux is not as wide as desired. Therefore if the scanning rate is constant, the outputs of the microphotoelectric elements mentioned above may become saturated or may drop to a noise level with the result that sometimes it is again difficult to detect the output difference.

A technique for eliminating the above-described difficulties has been known in the art. With this technique, an average illumination detecting photoelectric element is disposed adjacent to the self-scanning type photoelectric element and the scanning rate of the self-scanning type photoelectric element is varied according to the magnitude of the output of the average illuminating detecting photoelectric element. That is, an output equivalent to the average ambient illumination is provided by the single photoelectric element provided for this purpose and the output produced thereby is utilized to control the scanning rate. More specifically, if, when an average illuminance $\overline{E}$ is changed into a value $\overline{E}'$ upon being increased or decreased by a factor $\alpha$, the outputs $E_1'$ and $E_2'$ of the two microphotoelectric elements become equal to $\alpha E_1$ and $\alpha E_2$ ($E_1' = \alpha E_1$, and $E_2' = \alpha E_1$), respectively. The output difference $\Delta V' = \Delta V$ can be determined by setting the scanning time to $T_o' = T_o/\alpha$. With this technique, even when the average brightness of the object is changed (either increased or decreased), the output difference of the above-described two microphotoelectric elements is maintained unchanged and the dynamic range of the photoelectric output signal with respect to luminous flux is increased and accordingly a focus indicating signal is provided even for an object low in brightness.

However, this technique is still disadvantageous in the following point. That is, if an object moves during the measuring period or the camera is shaken, then the output of the average illumination detecting photoelectric element is varied and, accordingly, the output difference between the two microphotoelectric elements is varied.

Accordingly, an object of the present invention is to provide a focus detecting device in which the above-described difficulties have been eliminated, the contrast signal of an object to be photographed is constant even if the average brightness of the object increases or decreases, the dynamic range of the photoelectric output signal with respect to luminous flux is increased thereby to provide an effective contrast signal even for an object of low in brightness and even when an object moves or the camera is shaken so that a satisfactory focus detection is carried out.

Another object of the invention is to provide a focus detecting device which is both economical and compact and which may be manufactured utilizing ordinary components in a single-lens reflex camera.

SUMMARY OF THE INVENTION

These, as well as other objects of the invention, are met by a focus detecting device for a camera including a self-scanning type photoelectric element having a plurality of microphotoelectric elements and a scanning circuit for producing a contrast signal of the image of an object to be photographed thereby to automatically detect a point of proper focus a photoelectric element for detecting average illumination in a plane perpendicular to the optical axis of an optical image, an optical system for forming on the average detecting photoelectric element the image of the object from which a high spetial frequency components removed, and a pulse generator for generating a clock pulse signal for driving the self-scanning type photoelectric elements wherein the frequency of the clock pulse signal varies in accordance with the magnitude of an output of the average detecting photoelectric element so that, as the brightness of the object being viewed increased, the frequency of the clock pulse signal correspondingly increases to thereby produce a contrast signal which is free from variations due to changes in brightness of the object and from which have been removed components of the contrast signal produced due to movement of the object.

The optical system is positioned or disposed so as to form on the average detecting photoelectric element an image of the object being viewed and photographed which is out of focus. In a preferred embodiment, the optical system includes a diffuser plate and a lens which operates to condense on the average detecting photoelectric element rays which have been scattered by the diffuser plate.

In a preferred embodiment, a current-to-voltage converter is provided having an input coupled to an output of the average detecting photoelectric element with a voltage-to-frequency converter having an input coupled to an output of the current-to-voltage converter, an input of the clock pulse generator being coupled to an output of the voltage-to-frequency converter. They also may be provided a half-silvered mirror in the optical system disposed so as to direct a first portion of light emerging from the lens in the optical system toward the average detecting photoelectric element and a second portion of light to the self-scanning type photoelectric element.

BRIEF DESCRIPTION OF THE DRAWINGS

FIG. 6 is a graphical representation indicating variations in the output of the average illumination detecting photoelectric element due to shaking of a camera or the like;

DESCRIPTION OF THE PREFERRED EMBODIMENTS

The invention will be described with reference to the accompanying drawings.

Figure 1:
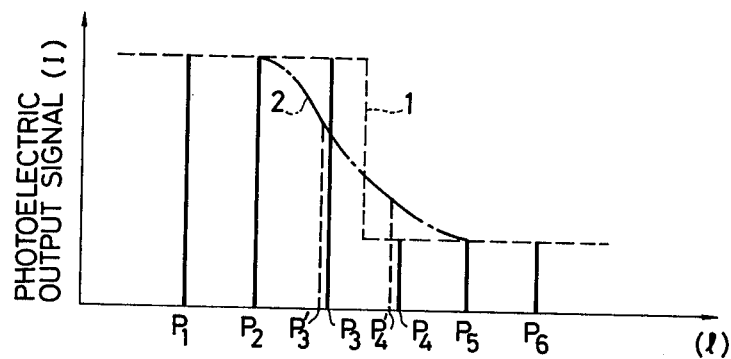
FIG. 1 is a graphical representation indicating variations in the output of a self-scanning type photoelectric element for both focus and out-focus.

FIG. 1 is a graphical representation indicating the response to a photoelectric output signal when an edge-shaped optical image is applied to a self-scanning type photoelectric element. In FIG. 1, reference characters $P_1$ through $P_6$ designate the positions of six microphotoelectric elements. The photoelectric output signal of each microphotoelectric element is indicated by a corresponding bar. An optical image at the position of proper focus is indicated by the dotted line 1 while the same image for a out-focused position is indicated by the dot-dash line 2.

Figure 2:
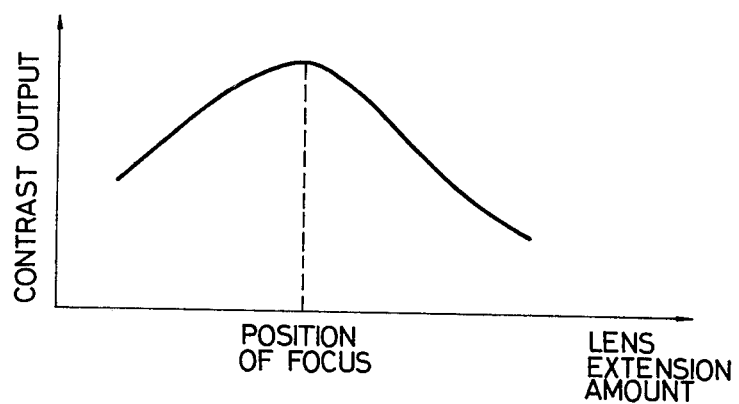
FIG. 2 is a graphical representation indicating how a contrast signal reaches its maximum at the point of focus.

In the case where the state of the optical image is varied as shown in FIG. 1, the outputs of the microphotoelectric elements indicated by $p_3$ and $p_4$ at the point of focus are changed to those indicated by $p_3'$ and $p_4'$ at a given point of out-focus. If the photoelectric output signals at $p_3$ and $p_4$ are represented by $I(p_3)$ and $I(p_4)$ and those at $p_3'$ and $p_4'$ by $I(p_3')$ and $I(p_4')$, repectively, then the absolute value $C = |I(p_3) - I(p_4)|$ of the output difference of the two elements at the point of proper focus differs from that $C' = |I(p_3') - I(p_4')|$ at the given point of out-focus. That is, the absolute value is larger at the time of focus. The absolute value of the output difference is referred to as "contrast output". When a self-scanning type photoelectric element is placed at a position equivalent to the film surface in a camera, the contrast output, as shown in FIG. 2, is distributed in the form of an arc with respect to the amount of extension of the lens having its maximum value at the point of focus.

Figure 3:
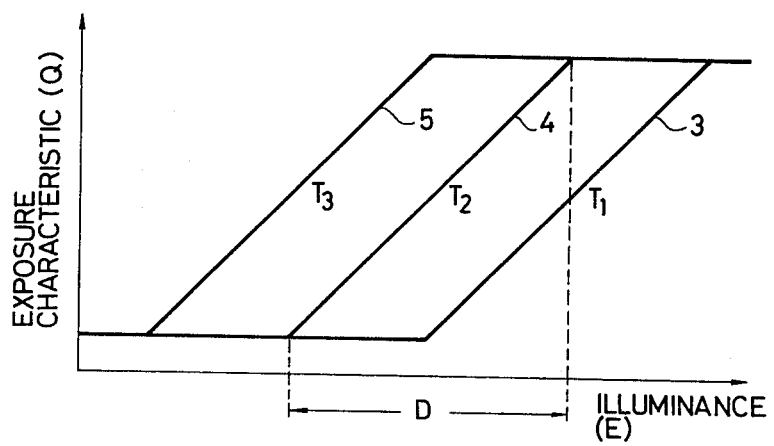
FIG. 3 is a diagram indicating a typical illumination vs. exposure characteristic of a self-scanning type photoelectric element.

FIG. 3 is a graphical representation indicating an ordinary illuminance (E) vs. exposure (Q) characteristic. With respect to scanning times $T_1$, $T_2$ and $T_3$ in a single scanning period, the characteristic is varied as distributions 3, 4 and 5, respectively. The relation of these scanning times is $T_1 < T_2 < T_3$. A dynamic range over which the exposure is not saturated is indicated by D. If the scanning rate is constant, then the photoelectric output varies with the magnitude of illumination in the range D. If the scanning rate is made variable depending on the brightness of an object to be photographed and the scanning rate is increased as the brightness of the object increases, then the dynamic range is increased and, even when the average brightness of the object changes, a constant contrast signal is obtained.

Figure 4:
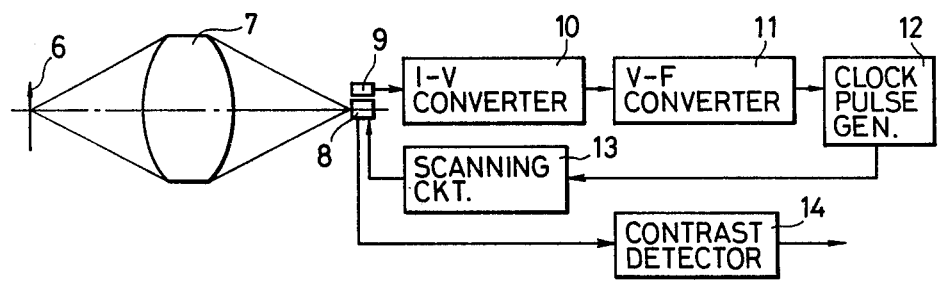
FIG. 4 is an explanatory diagram, partly as a block diagram, for a description of a technique by which a contrast signal free from effects of variations in brightness is produced utilizing an average illumination detecting photoelectric element.

In order to implement such a technique, a device as shown in FIG. 4 is provided. The image of an object 6 to be photographed is formed on a self-scanning type photoelectric element 8 by a lens 7. A single average illumination detecting photoelectric element 9 is positioned in the plane of the self-scanning type photoelectric element 8. The optical current produced by the average illumination detection photoelectric element 9 is converted into a voltage output by a current-to-voltage conversion circuit 10. Variations in the output voltage are converted into variations in frequency by a frequency conversion circuit 11 the output of which is applied to a clock pulse generating circuit 12 where it is converted into a train of pulses of variable frequency. The train of pulses is applied to a scanning circuit 13 becoming a scanning pulse signal for driving the self-scanning photoelectric element 8. Scanning the image of the object by the self-scanning photoelectric element 8 produces a photoelectric output signal from which the contrast signal of the object image is extracted by a contrast detecting circuit 14. In the device described above, if the average brightness of the image of an object increases, the self-scanning type photoelectric element 8 is as at a high scanning speed so that the dynamic range can be increased as described above.

Figure 5:
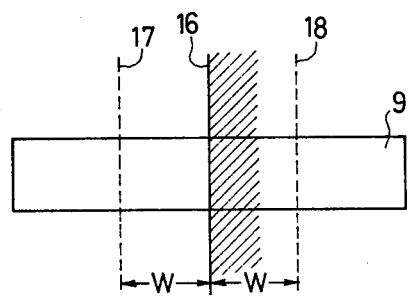
FIG. 5 is an explanatory diagram showing the movement of the image of an object to be photographed on the average illumination detection photoelectric element.

However, if the image of an object formed on the average illumination detection photoelectric element 9 vibrates because the object moves or the camera is shaken, then the photoelectric output will vary. FIG. 5 shows the movement of the image of an edge-shaped object 16 to a position 17 or 18 spaced by W therefrom on the average illumination detecting photoelectric element 9. If the image vibrates as shown in FIG. 5, then the output of the average illumination detecting photoelectric element 9 varies even through the contrast distribution of the object is the same as a result of which the scanning speed changes and the contrast signal is changed.

Figure 6:
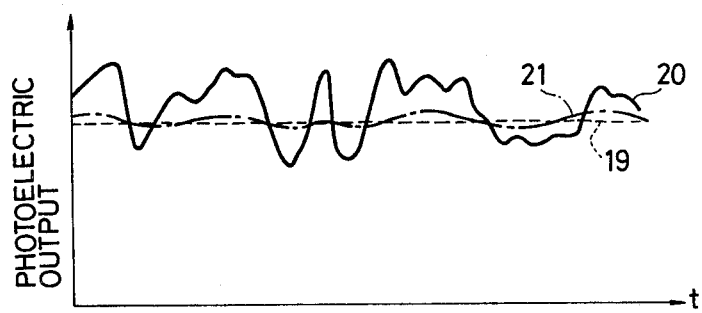

FIG. 6 indicates variations of the photoelectric output of the average illumination detecting photoelectric element 9 attributed to the above-described image variation. In FIG. 6, the dotted line 19 indicates the photoelectric output signal which is produced when the image of an object is stationary while the solid line 20 indicates the photoelectric output signal which is produced when the object image moves.

In order to eliminate the difficulty described above, in accordance with the invention, the image of an object formed on the average illumination detecting photoelectric element is defocused. That is, the high spatial frequency component is removed. In this case, the output provided remains essentially constant. This is one of the specific features of the present invention. The dot-dash line 21 in FIG. 6 indicates the photoelectric output signal which is produced when the high spatial frequency component is removed as described above.

Figure 7:
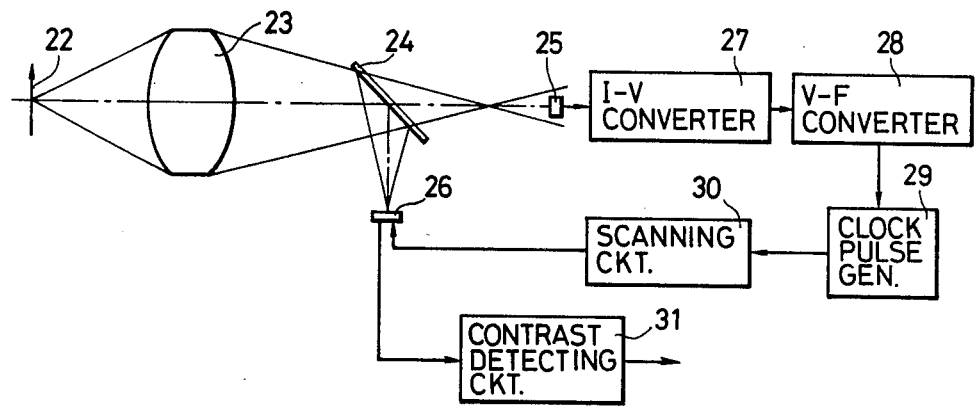
FIG. 7 is an explanatory diagram, partly as a block diagram, showing an example of a focus detecting device according to the invention.

Shown in FIG. 7 is an example of a device for practicing the technical concept of the invention. The image of an object 22 to be photographed is formed by a lens 23. A half-silvered mirror 24 is placed behind the lens 23 at a position such that light from the object is reflected by the half-silvered mirror 24 toward a self-scanning type photoelectric element 26 forming the image of the object thereon. The light passing through the half-silvered mirror 24 is directed toward an average illumination detection photoelectric element 25 forming the object image before the element 25. In this connection, the device may be so designed that the object image is formed behind the photoelectric element 25. Furthermore, the device may be so designed that, unlike the device shown in FIG. 7, the average illuminance is detected utilizing the light reflected by the half-silvered mirror.

The photoelectric output of the average illumination detecting photoelectric element 25 is converted into a voltage output by a current-to-voltage conversion circuit 27. Variations in the voltage output of the circuit 27 are converted into variations in frequency by a frequency conversion circuit 28, the output of which is converted into a train of pulses having a variable frequency by a clock pulse generating circuit 29. The train of pulses is applied to a scanning circuit 30 becoming a scanning pulse signal for driving the self-scanning type photoelectric element 26 from the output of which a contrast signal is extracted by a suitable contrast detecting circuit 31. In the device thus constructed, the image of the object on the average illumination detecting photoelectric element 25 is out of focus and therefore the photoelectric output signal is but little varied by movement of the object or by shaking of the camera. Accordingly, the contrast signal obtained is free from the vibrationally induced variations of the image of an object to be photographed.

Figure 8:
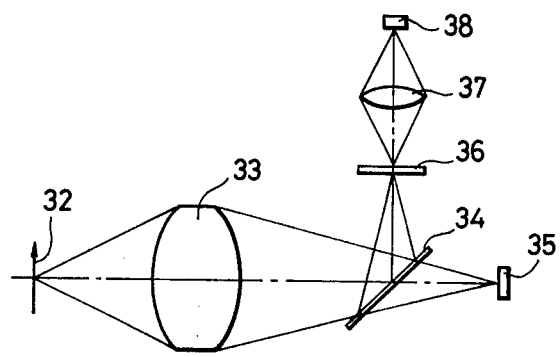
FIG. 8 is an explanatory diagram showing another example of the device according to the invention.

FIG. 8 shows another example of the device according to the invention. In accordance with this embodiment, the image of an object to be photographed is formed on a diffuser plate 36 so as to remove the high spatial frequency component of the image of the object. Light from the object 32 is applied through a half-silvered mirror 34 to a self-scanning type photoelectric element 35 and to the diffuser plate 36 by means of a lens 33 so that the image of the object 32 is formed on both of the element 35 and the plate 36. The image on the diffuser plate 36 is formed again on an average illumination detecting photoelectric element 38 by a lens 37. The output of the photoelectric element 38 is processed similarly to the embodiment of FIG. 7 and, as a result, a contrast signal free from the effects of vibration of the image of the object is provided. In this connection, the lens 37 may be positioned so that the image on the average illumination detecting photoelectric element 38 is out of focus. This will provide a more effective result. The arrangement in FIG. 8 is similar to the arrangement of a single-lens reflex camera so that therefore the diffuser plate may be used as the focusing plate as well.

Figure 9:
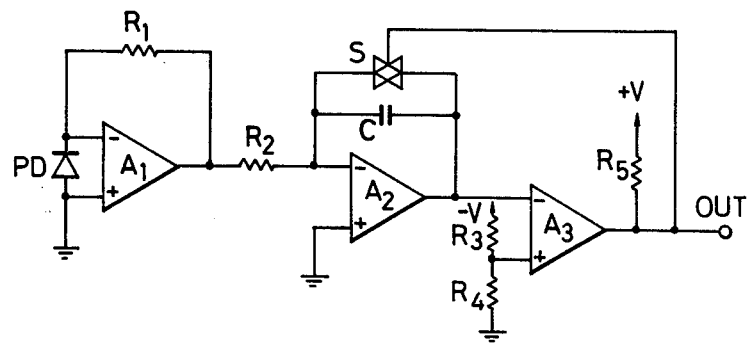
FIG. 9 is a circuit diagram, partly as a block diagram, showing an example of a circuit used with the device according to the invention.

An example of a circuit used with the device according to the invention is as shown in FIG. 9. In the circuit, the photo-current from the average illumination detecting photodiode PD is converted into a voltage by an operational amplifier $A_1$. A capacitor C, connected in parallel to another operational amplifier $A_2$, is charged by this voltage. The output of the capacitor C thus charged is compared with a threshold value determined by resistors $R_3$ and $R_4$ in a comparator utilizing an operational amplifier $A_3$. When the voltage of the capacitor C exceeds the threshold value, an analog switch S is turned on as a result of which the capacitor C is quickly discharged to its initial condition. At the same time, the state of the output of the comparator changes and, accordingly, the analog switch S is turned off again. The capacitor C is repeatedly charged and discharged in this manner and a clock pulse signal is provided at a terminal marked OUT. This clock pulse signal is applied to the scanning circuit of the self-scanning type photoelectric element to control the scanning operation.

As is apparent from the above description, in the contrast detection type focus detecting device utilizing the self-scanning type photoelectric element according to the invention, even if the average brightness of an object to be photographed is changed, either increasing or decreasing, the contrast output nonetheless remains constant at all times and the dynamic range of photoelectric output with respect to quantity of light is correspondingly increased. Accordingly, the focus indicating signal is provided for both an object having a low brightness as well as an object having an extremely high brightness. The signal thus produced is substantially free from effects caused by movement of the object or shaking of the camera. Thus, an automatic focus detection camera having a high reliability and accuracy can be provided according to the invention. In addition, as the mechanism of a single-lens reflex camera can be utilized, the camera provided by the invention is economical and compact.

What is claimed is:

1. A focus detecting device for a camera comprising: a self-scanning type photoelectric element having a plurality of microphotoelectric elements and a scanning circuit for producing a contrast signal of an image of an object to be photographed thereby to automatically detect a point of proper focus; an average illumination detecting photoelectric element for detecting average brightness in a plane perpendicular to the optical axis of an optical image; an optical system for forming on said average illumination detecting photoelectric element the image of said object from which a high spatial frequency component is removed; and a pulse generator for generating a clock pulse signal for driving said self-scanning type photoelectric elements, the frequency of said clock pulse signal varying with the magnitude of an output of said average detecting photoelectric element wherein as the brightness of said object increases, the frequency of said clock pulse signal increases to thereby produce a contrast signal free from variations due to changes in brightness of said object and from which have been removed variation components of said contrast signal due to movement of said object.

2. The focus detecting device as claimed in claim 1 wherein said optical system is disposed so as to form on said average illumination detecting photoelectric element an image of said object which is out of focus.

3. The focus detecting device as claimed in claim 1 wherein said optical system comprises a diffuser plate and a lens which operates to condense on said average illumination detecting photoelectric element rays scattered by said diffuser plate.

4. The focus detecting device of claims 1, 2 or 3 further comprising:

a current-to-voltage converter having an input coupled to an output of said average illumination detecting photoelectric element; and a voltage-to-frequency converter having an input coupled to an output of said current-to-voltage converter, an input of said clock pulse generator being coupled to an output of said voltage-to-frequency converter.

5. The focus detecting device of claims 1, 2 or 3 wherein said optical system comprises:

a half transparency mirror disposed to direct a first portion of light toward said average illumination detecting photoelectric element and a second portion of light to said self-scanning type photoelectric element; and further comprising:

a current-to-voltage converter having an input coupled to an output of said average illumination detecting photoelectric element; and a voltage-to-frequency converter having an input coupled to an output of said current-to-voltage converter, an input of said clock pulse generator being coupled to an output of said voltage-to-frequency converter.

6. A focus detecting device for a camera comprising: a self-scanning type photoelectric element having a plurality of microphotoelectric elements and a scanning circuit are for producing a contrast signal of an image of an object to be photographed to thereby automatically detect a point of proper focus; an average illumination detecting photoelectric element for detecting average brightness of said object being photographed; means for removing a high frequency component from the output signal produced by said average illumination detecting photoelectric element; and a pulse generator for producing a clock pulse signal for driving said self-scanning type photoelectric element, the frequency of the clock pulse signal being varied in accordance with said output signal from said average illumination detecting photoelectric element wherein, as the brightness of said object increases, the frequency of said clock pulse signal increases to thereby produce a contrast signal free from variations due to changes in brightness of said object and due to components of said output signal from said average illumination detecting photoelectric element caused by movement of the object or the camera.

* * * * *